US006794574B2

(12) United States Patent
Gust et al.

(10) Patent No.: US 6,794,574 B2
(45) Date of Patent: Sep. 21, 2004

(54) ELECTRICAL TUBING ASSEMBLY WITH HERMETICALLY SEALED ENDS

(75) Inventors: James M. Gust, Wolcottville, IN (US); Donald E. DeWitt, Syracuse, IN (US); Scott A. Garver, Fort Wayne, IN (US); Robert E. Bolen, Kendallville, IN (US)

(73) Assignee: Dekko Technologies, Inc., North Webster, IN (US)

( * ) Notice: Subject to any disclaimer, the term of this patent is extended or adjusted under 35 U.S.C. 154(b) by 36 days.

(21) Appl. No.: 09/859,718

(22) Filed: May 17, 2001

(65) Prior Publication Data

US 2002/0033269 A1 Mar. 21, 2002

Related U.S. Application Data

(63) Continuation-in-part of application No. 09/665,478, filed on Sep. 20, 2000, now Pat. No. 6,395,986.

(51) Int. Cl.[7] .............................................. H02G 3/18
(52) U.S. Cl. ............... 174/65 G; 174/135; 174/65 SS; 174/98; 16/2.1
(58) Field of Search ........................ 174/65 G, 135, 174/151, 65 S, 65 R, 152 G, 153 G, 68.1, 98, 74 R, 102 R, 77 R, 50.5, 50.56; 439/274, 275; 16/2.1, 2.2

(56) References Cited

U.S. PATENT DOCUMENTS

| 2,597,338 | A | | 5/1952 | Kohrning ................. 201/67 |
|---|---|---|---|---|
| 2,719,279 | A | | 9/1955 | Muckler ................... 339/177 |
| 3,029,406 | A | | 4/1962 | Huth ........................ 339/59 |
| 3,144,545 | A | * | 8/1964 | Shrimplin et al. ........ 174/98 X |
| 4,271,458 | A | * | 6/1981 | George, Jr. ............... 362/236 |
| 4,278,836 | A | * | 7/1981 | Bingham .................. 174/84 S |
| 4,556,271 | A | | 12/1985 | Hubbard ................... 339/94 |
| 4,701,574 | A | * | 10/1987 | Shimirak et al. .......... 174/93 |
| 4,778,949 | A | | 10/1988 | Esterle et al. ............ 174/151 |
| 4,842,540 | A | | 6/1989 | Endo et al. ............... 439/271 |
| 4,864,080 | A | * | 9/1989 | Fochler et al. .......... 174/65 G |
| 5,043,627 | A | * | 8/1991 | Fox ......................... 313/491 |
| 5,120,268 | A | | 6/1992 | Gerrans ................... 439/736 |
| 5,283,393 | A | * | 2/1994 | Guginsky ................. 174/68.1 |
| 5,349,137 | A | * | 9/1994 | Cedrone ................... 174/76 |
| 5,565,652 | A | * | 10/1996 | Frye ......................... 174/24 |
| RE35,820 | E | * | 6/1998 | Guginsky ................. 174/68.1 |
| 5,780,771 | A | * | 7/1998 | Beckwith et al. ......... 174/17.08 |
| 6,042,421 | A | | 3/2000 | Stafford Gray et al. .... 439/578 |
| 6,133,532 | A | | 10/2000 | Lundbäck et al. ......... 174/88 |
| 6,283,612 | B1 | * | 9/2001 | Hunter ..................... 362/240 |

FOREIGN PATENT DOCUMENTS

GB 568596 4/1945

* cited by examiner

*Primary Examiner*—Dhiru R Patel
(74) *Attorney, Agent, or Firm*—Taylor & Aust, P.C.

(57) ABSTRACT

An electrical assembly includes at least one electrical conductor. A flexible electrical tubing has an end, and loosely carries the at least one electrical conductor therein. An electrical component, such as an electrical connector or plug, is associated with the electrical conductor and hermetically seals the tubing end.

16 Claims, 3 Drawing Sheets

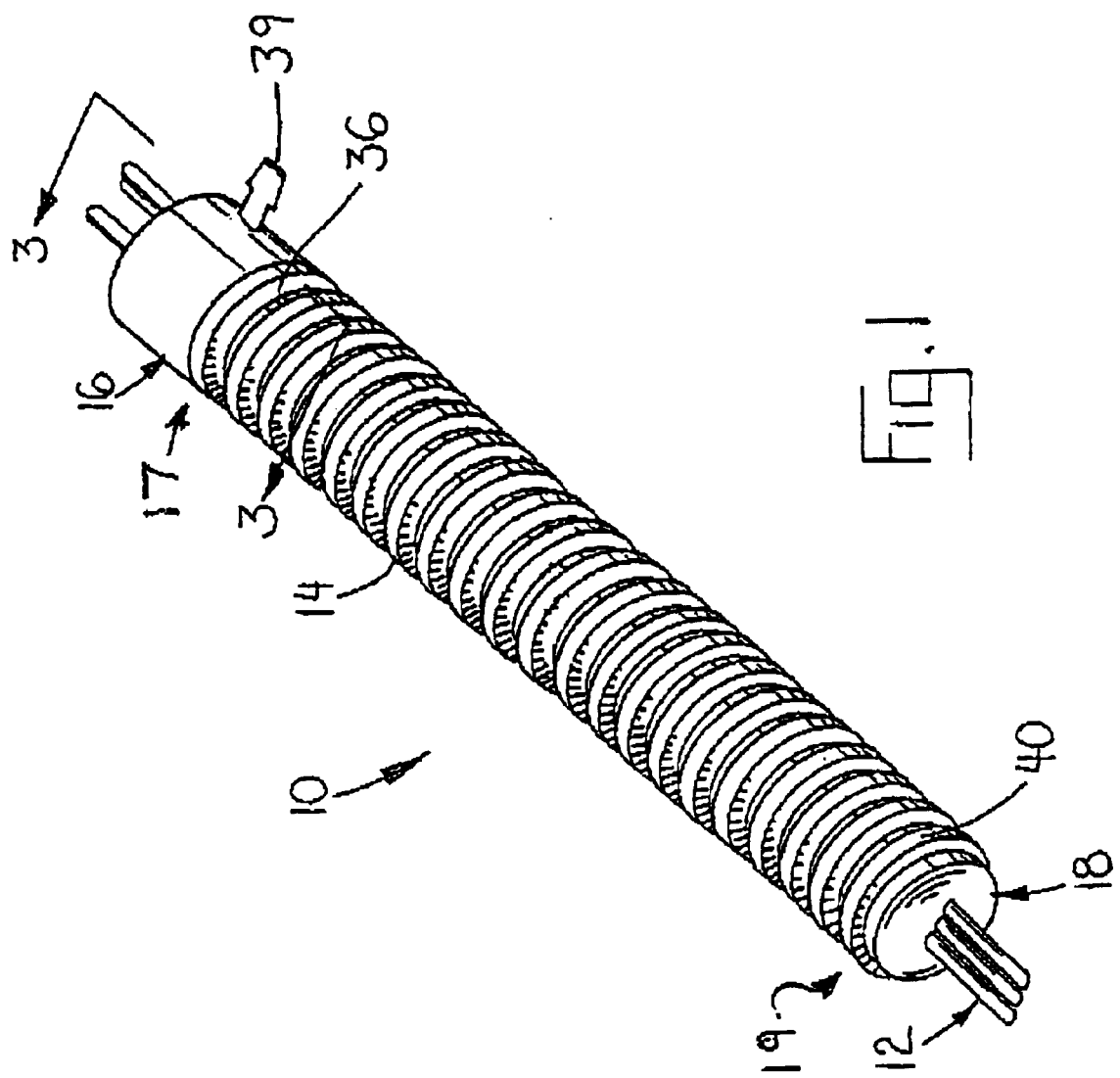

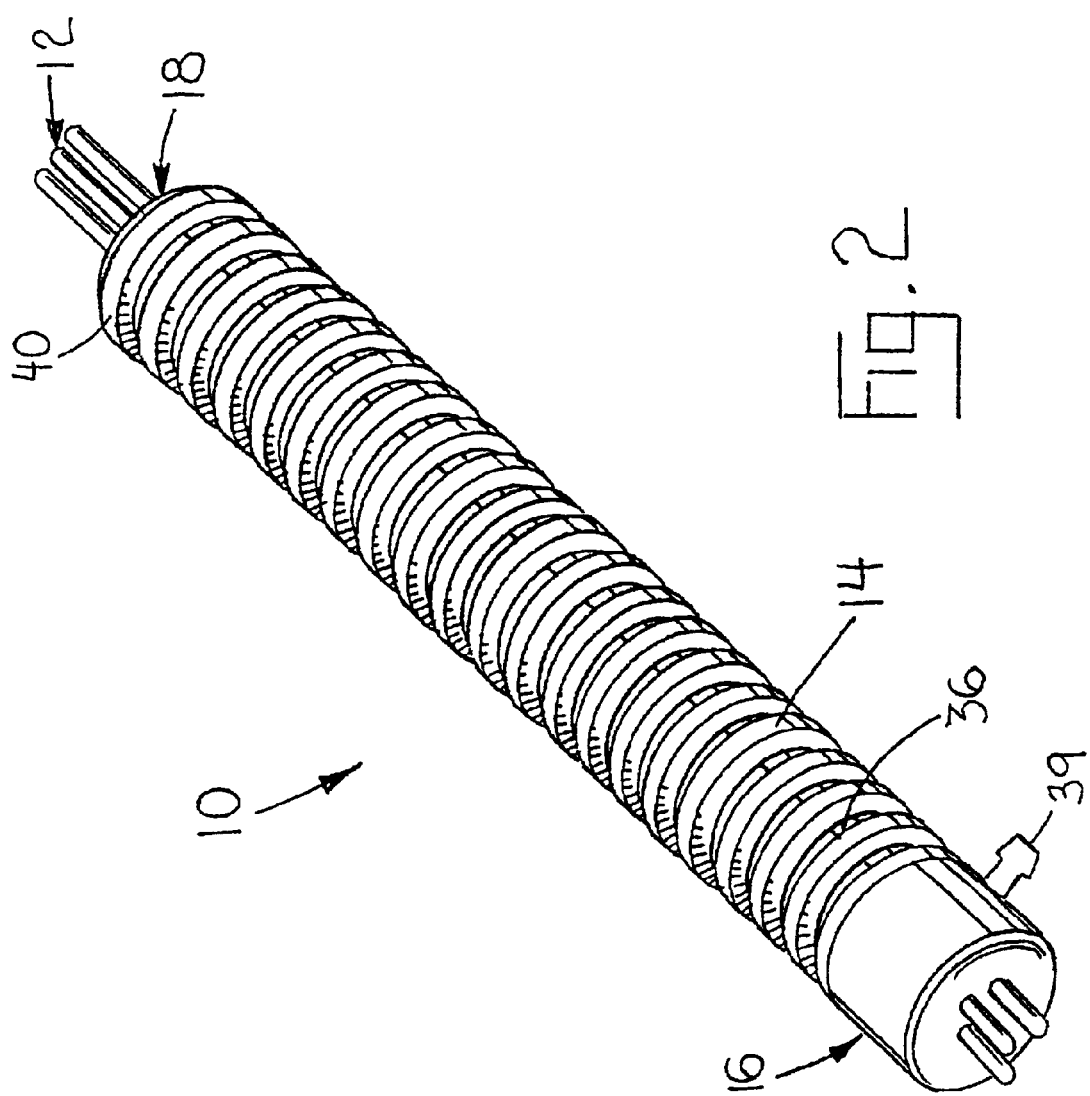

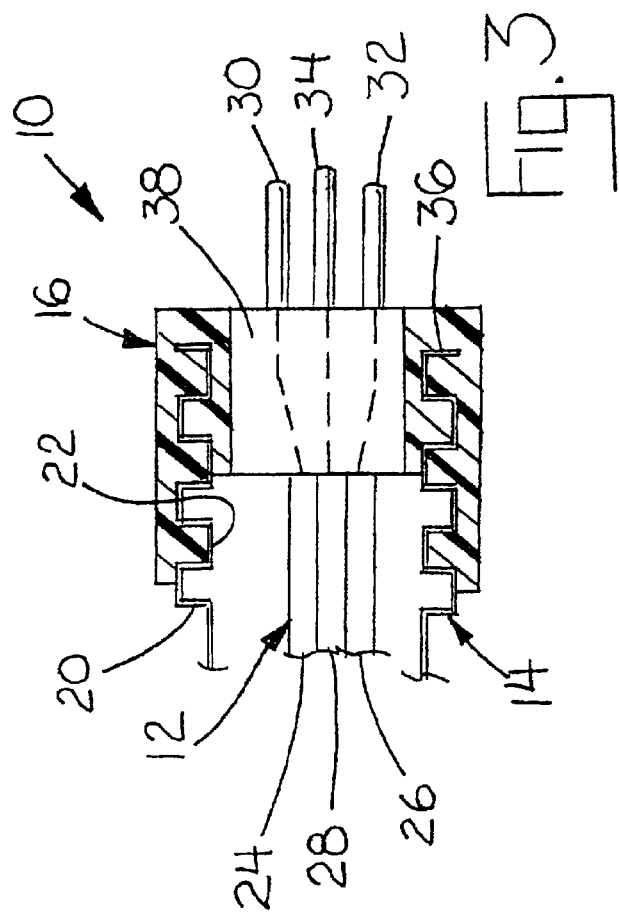
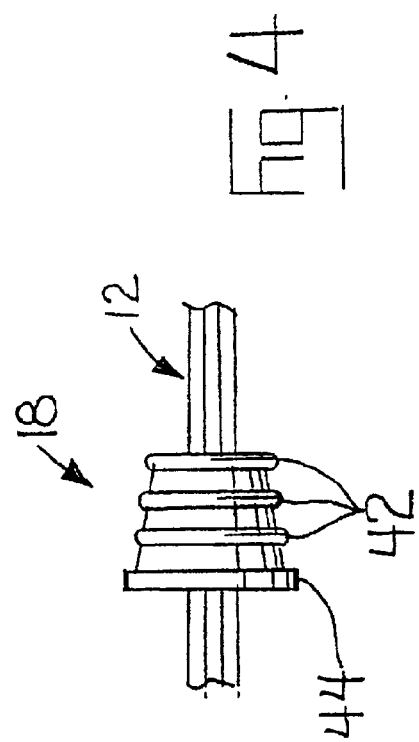

ELECTRICAL TUBING ASSEMBLY WITH HERMETICALLY SEALED ENDS

CROSS REFERENCE TO RELATED APPLICATIONS

This is a continuation-in-part of U.S. patent application Ser. No. 09/665,478, entitled "ELECTRICAL CONVOLUTED TUBING WITH OVERMOLDED GROMMET" filed Sep. 20, 2000 now U.S. Pat. No. 6,395,986.

BACKGROUND OF THE INVENTION

1. Field of the Invention

The present invention relates to electrical assemblies, and, more particularly, to electrical tubing assemblies.

2. Description of the Related Art

An electrical tubing assembly is used to carry electrical conductors from one location to another and protect the electrical conductors from damage caused by mechanical contact such as may occur during impact or vibration. It is known to provide electrical convoluted tubing to carry electrical conductors from one location to another. Electrical convoluted tubing typically includes a plurality of generally parallel, annular convolutions which allow the tubing to be flexed as it extends from one location to another. The tubing may include a longitudinal split along one side thereof allowing the electrical conductors to be inserted or removed therefrom.

To prevent the convoluted tubing from being physically damaged and thereby possibly damaging the electrical conductors therein, it is also known to carry the convoluted tubing within a rubber grommet positioned within a cut-out in a mounting bracket. For example, electric motors, engines, household appliances, etc. may include mounting brackets for carrying rubber grommets. The grommet is a separate piece which is first inserted into a cut-out in the mounting bracket. Thereafter, it is necessary to affix the convoluted tubing to the grommet. A problem with this type of assembly is that often times the tubing may be of considerable length to extend between the desired termination locations. It is difficult to handle the tubing when affixing it to the grommet which results in considerable time being expended to run the electrical conductors from one location to another. Moreover, it is not uncommon to damage the convoluted tubing as a result of the axial force applied thereto trying to attach the tubing to the grommet. Because of these difficulties, it is fairly common to first run the electrical conductors through the various grommets and then merely cut the convoluted tubing to extend between the grommets without going through the grommet. Electrical conductors may therefore be exposed at locations adjacent to the grommets, allowing the conductors to be physically damaged and possibly causing an electrical shorting condition. Long electrical conductors are also frequently damaged through handling around metal enclosures with this assembly method.

Another problem with a tubing assembly as described above is that the one or more electrical conductors typically exit the open ends of the tubing near a location where the corresponding electrical component to which the electrical conductors are attached is positioned. It is thus possible for water, dirt or other foreign matter to enter the tubing at the ends thereof. The tubing thus does not form an integral assembly with the electrical conductors carried thereby, but rather merely functions to protect the electrical conductors from physical damage as the conductors extend from one termination location to another.

What is needed in the art is a tubing assembly which may be sold as a preassembled and hermetically sealed unit, thereby reducing assembly costs and inhibiting physical damage at the end use location.

SUMMARY OF THE INVENTION

The present invention provides an electrical tubing assembly with an electrical component, such as an electrical connector, plug, etc., at either end thereof which is associated with electrical conductors passing through the tubing and hermetically seals the opposite ends of the tubing.

The invention comprises, in one form thereof, an electrical assembly including at least one electrical conductor. A flexible electrical tubing has an end, and loosely carries the at least one electrical conductor therein. An electrical component, such as an electrical connector or plug, is associated with the electrical conductor and hermetically seals the tubing end.

An advantage of the present invention is that a conventional tubing, such as a convoluted or spiral tubing, is easily and inexpensively transformed into a hermetically sealed assembly for conveying electrical power from one point to another.

Another advantage is that the electrical connector or plug is hermetically sealed with the respective end of the tubing using one of a multiplicity of interconnection techniques.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a perspective view of an embodiment of an electrical assembly of the present invention;

FIG. 2 is another perspective view of the electrical assembly shown in FIG. 1;

FIG. 3 is a sectional view of the electrical connector shown in FIGS. 1 and 2, taken along line 3—3 in FIG. 1; and FIG. 4 is a side view of the plug shown in FIGS. 1 and 2.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Referring now to the drawings, and more particularly to FIGS. 1 and 2, there is shown an embodiment of an electrical wiring assembly 10 of the present invention, which generally includes an electrical cable 12, a flexible electrical tubing 14, and a pair of electrical components 16 and 18.

Tubing 14 loosely carries electrical cable 12 therein. Tubing 14, in the embodiment shown in FIGS. 1 and 2, is in the form of a convoluted tubing having a non-smooth outer surface 20 and a non-smooth inner surface 22 (FIG. 3). More particularly, convoluted tubing 14 has a plurality of generally parallel, annular convolutions around outer surface 20. The convolutions thus define a plurality of longitudinally adjacent lands and valleys alternately positioned adjacent to each other along the length of tubing 14. Tubing 14 is formed from a flexible material such as plastic, with the convolutions formed therein. The flexible material and convolutions allow tubing 14 to be positioned or routed along any desired surface so that the electrical cable 12 (or other suitable electrical conductors) will likewise be routed from one location to another. For example, tubing 14 may be used to carry and protect electrical conductors from a junction box to terminal connection locations associated with an electric motor, generator or engine.

The convolutions formed in outer surface 20 of tubing 14 are illustrated as being annular shaped in the embodiment shown in FIGS. 1–3. However, it is to also be understood that non-smooth outer surface 20 may be formed with other than annular shaped convolutions. For example, outer surface 20 may have a non-smooth outer surface with a spiral shape. The term "non-smooth" used to described outer surface 20 is not intended to mean mere surface roughness of tubing 14. Rather, tubing 14 is formed with a "non-smooth" surface which allows bending and flexing of tubing 12 without kinking or other physical damage.

Tubing 14, in the embodiment shown in FIGS. 1–3, is formed with a solid sidewall extending the entire length thereof. Tubing 14 may also optionally include a longitudinal split extending the entire length or only a portion of the length thereof to allow electrical conductors to be inserted or removed. Preferably, however, tubing 14 does not include a longitudinal slit so that it may be hermetically sealed using electrical components 16 or 18 at either end thereof. First end 17 of tubing 14 and second end 19 of tubing 14 are solely hermetically sealed by an interaction of electrical components 16 and 18 with tubing 14. Tubing 14 is preferably formed from plastic, but may also be formed from other suitable materials, such as a thin walled, metal material.

Electrical cable 12 includes a plurality of electrical conductors 24, 26 and 28. In the embodiment shown, conductor 24 is in the form of a line conductor, conductor 26 is in the form of a neutral conductor, and conductor 28 is in the form of a ground conductor. Electrical cable 12 occupies a cross-sectional area within tubing 14 which is less than the cross sectional area of tubing 14, thereby allowing electrical cable 12 to be easily inserted into or withdrawn from tubing 14. Electrical conductors 24–28 may alternatively be separate conductors which are carried within tubing 14, rather than being joined together in the form of cable 12.

Electrical component 16, in the embodiment shown, is in the form of an electrical connector having a plurality of electrical terminals 30, 32 and 34. Terminal 30 is electrically connected with line conductor 24; terminal 32 is electrically connected with neutral conductor 26; and terminal 34 is electrically connected with ground conductor 28, as indicated by the respective interconnecting phantom lines shown in FIG. 3. Electrical component 16 is positioned at an end 36 of tubing 14, and hermetically seals tubing 14 at end 36. Electrical component 16 preferably solely hermetically seals end 40 of tubing 14. More particularly, electrical connector 16 includes an insert body 38, which is inserted into end 36 of tubing 14. End 36, with insert body 38 inserted therein, are then placed within a mold and plastic is injected into the mold to define connector 16 surrounding a portion of outer surface 20 as well as insert body 38. The outer periphery of insert body 38 is structured such that only a predetermined amount of plastic flows into the space between insert body 38 and inner surface 22 of tubing 14. As a result of the injection molding process, connector 16 has an outer periphery radially within inner surface 22, which is in continuous, intimate physical contact with inner surface 22. A snap-fit projection 39 may be inserted into an opening of a work piece (not shown) to allow connector 16 to be coupled with the work piece.

Electrical component 18, in the embodiment shown, is in the form of a plug which hermetically seals end 40 of tubing 14. Electrical component 18 preferably solely hermetically seals end 40 of tubing 14. Electrical cable 12 extends through and is sealed with plug 18. To wit, plug 18 may be formed with a longitudinally extending cut out which frictionally engages cable 12, or may be formed directly around cable 12 using an insert molding process.

Referring to FIG. 4, plug 18 is shown in greater detail. Plug 18 has a generally frusto-conical shaped outer periphery which allows it to be placed within inner surface 22 of tubing 14 at end 40 and thereby frictionally engage inner surface 22. Plug 18 preferably includes an outer periphery having one or more annular projections 42 which engage inner surface 22 and retain plug 18 within tubing 14. A distal shoulder 44 at the larger diameter end of plug 18 prevents plug 18 from being inserted to far within tubing 14.

In contrast with conventional electrical tubing assemblies, electrical connector 16 has an outer periphery within tubing 14 which exactly conforms to the shape of inner surface 22. Electrical connector 16 thus is axially fixed with respect to tubing 14 and cannot slide in an axial direction with respect to tubing 14. Further, the portion of electrical connector 16 extending radially outward from outer surface 20 also exactly conforms to the shape of outer surface 20 to prevent axial movement of electrical connector 16 relative to tubing 14. By preventing electrical connector 16 from sliding in an axial direction along tubing 14, the electrical conductors within tubing 14 are likewise not displaced which prevents undue stress at the electrical connection interface between conductors 24–28 and terminals 30–34.

In the embodiment of electrical assembly 10 shown in FIGS. 1–4 and described above, electrical connector 16 is coupled with tubing 14 via an insert molding process, and plug 18 is coupled with tubing 14 via a press fit. However, it is also apparent that electrical connector 16 may be coupled with tubing 14 via a press fit or other suitable interconnection technique, as long as end 36 of tubing 14 is hermetically sealed with electrical connector 16. Other interconnection techniques between plug 18 and tubing 14 are also possible.

While this invention has been described as having a preferred design, the present invention can be further modified within the spirit and scope of this disclosure. This application is therefore intended to cover any variations, uses, or adaptations of the invention using its in general principles. Further, this application is intended to cover such departures from the present disclosure as come within known or customary practice in the art to which this invention pertains and which fall within the limits of the appended claims.

What is claimed is:

1. An electrical wiring assembly, comprising:
   at least one electrical conductor;
   a flexible electrical tubing having a first end and a second end, said tubing loosely carrying said at least one electrical conductor, said at least one electrical conductor traversing said tubing from said first end to said second end; and
   an electrical component associated with said at least one electrical conductor, said electrical component solely hermetically sealing said first end, said electrical component comprising an electrical connector having at least one electrical terminal, said at least one electrical terminal connected with a corresponding said electrical conductor.

2. The electrical assembly of claim 1, said tubing including an inner surface, said electrical component hermetically sealing with said inner surface.

3. The electrical assembly of claim 1, said tubing including a non-smooth inner surface, said electrical component having an outer periphery which is in continuous, intimate physical contact with said inner surface.

4. The electrical assembly of claim 3, said electrical component formed by the process of insert molding with said tubing.

5. The electrical assembly of claim 1, said tubing having a non-smooth outer surface with one of a convoluted and spiral shape.

6. An electrical wiring assembly comprising:

at least one electrical conductor;

a flexible electrical tubing having a first end and a second end, said tubing loosely carrying said at least one electrical conductor, said at least one electrical conductor traversing said tubing from said first end to said second end; and an electrical component associated with said at least one electrical conductor, said electrical component solely hermetically sealing said first end, said electrical component comprising a plug, said at least one electrical conductor extending through and sealed with said plug.

7. An electrical wiring assembly, comprising:

at least one electrical conductor;

a flexible electrical tubing having a first end and a second end, said tubing loosely carrying said at least one electrical conductor said at least one electrical conductor traversing said tubing from said first end to said second end, said tubing including a non-smooth inner surface; and an electrical component associated with said at least one electrical conductor, said electrical component solely hermetically sealing said first end, said electrical component having an outer periphery with at least one annular projection engaged with said inner surface.

8. The electrical assembly of claim 1, said electrical component having a plurality of annular projections.

9. An electrical wiring assembly, comprising:

at least one electrical conductor;

a flexible electrical tubing having a first end and a second end, said tubing loosely carrying said at least one electrical conductor, said at least one electrical conductor traversing said tubing from said first end to said second end; and an electrical connector having at least one electrical terminal, said at least one electrical terminal connected with a corresponding said electrical conductor, said electrical connector solely hermetically sealing said first end.

10. The electrical assembly of claim 9, said tubing including a non-smooth inner surface, said electrical connector having an outer periphery with at least one annular projection engaged with said inner surface.

11. The electrical assembly of claim 10, said electrical connector having a plurality of annular projections.

12. The electrical assembly of claim 9, said tubing including a non-smooth inner surface, said electrical connector having an outer periphery which is in continuous, intimate physical contact with said inner surface.

13. An electrical wiring assembly, comprising:

at least one electrical conductor;

a flexible electrical tubing having a first end and a second end, said tubing loosely carrying said at least one electrical conductor, said at least one electrical conductor traversing said tubing from said first end to said second end; and a plug solely hermetically sealing said first end, said at least one electrical conductor extending through and sealed with said plug.

14. The electrical assembly of claim 13, said tubing including a non-smooth inner surface, said plug having an periphery with at least one annular projection engaged with said inner surface.

15. The electrical assembly of claim 14, said plug having a plurality of annular projections.

16. The electrical assembly of claim 13, said tubing including a non-smooth inner surface, said plug having an outer periphery which is in continuous, intimate physical contact with said inner surface.

* * * * *

UNITED STATES PATENT AND TRADEMARK OFFICE
CERTIFICATE OF CORRECTION

PATENT NO. : 6,794,574 B2
DATED : September 21, 2004
INVENTOR(S) : Gust et al.

It is certified that error appears in the above-identified patent and that said Letters Patent is hereby corrected as shown below:

Column 3,
Line 53, please delete "component", and insert therefore -- connector --.

Column 5,
Line 35, after the word "conductor", please insert -- , --; and
Line 44, please delete "1", and insert therefore -- 7 --.

Signed and Sealed this

Fifth Day of April, 2005

JON W. DUDAS
*Director of the United States Patent and Trademark Office*